US010871818B1

(12) United States Patent
De La Cropte De Chanterac et al.

(10) Patent No.: US 10,871,818 B1
(45) Date of Patent: Dec. 22, 2020

(54) COMPONENT POWER CONSUMPTION MANAGEMENT DETERMINING WHETHER THE POWER AVAILABILITY OF THE POWER SOURCE EXCEEDS THE EXPECTED POWER CONSUMPTION

(71) Applicant: Apple Inc., Cupertino, CA (US)

(72) Inventors: Cyril De La Cropte De Chanterac, San Francisco, CA (US); Michael Eng, San Jose, CA (US); Yuxin Bai, Santa Clara, CA (US); Karen Eckert, San Jose, CA (US); John Ananny, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 16/128,299

(22) Filed: Sep. 11, 2018

Related U.S. Application Data

(60) Provisional application No. 62/557,067, filed on Sep. 11, 2017.

(51) Int. Cl.
*G06F 1/32* (2019.01)
*G06F 1/3287* (2019.01)
*G06F 1/3234* (2019.01)

(52) U.S. Cl.
CPC .......... *G06F 1/3287* (2013.01); *G06F 1/3265* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Zahid Choudhury
(74) *Attorney, Agent, or Firm* — Blank Rome LLP

(57) ABSTRACT

A method of an electronic device that includes a power source is disclosed. The method determines a health of the power source, a temperature of the power source, and a state of charge of the power source. The method then sets a performance state cap for the electronic device based on at least the health of the power source.

25 Claims, 9 Drawing Sheets

(56) References Cited

U.S. PATENT DOCUMENTS

| | | | |
|---|---|---|---|
| 7,444,526 B2* | 10/2008 | Felter | G06F 1/3203 |
| | | | 713/300 |
| 7,663,607 B2 | 2/2010 | Hotelling et al. | |
| 8,479,122 B2 | 7/2013 | Hotelling et al. | |
| 2006/0197753 A1 | 9/2006 | Hotelling | |
| 2017/0085084 A1* | 3/2017 | Daly | G05B 15/02 |
| 2018/0188800 A1* | 7/2018 | Alon | G06F 1/3206 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

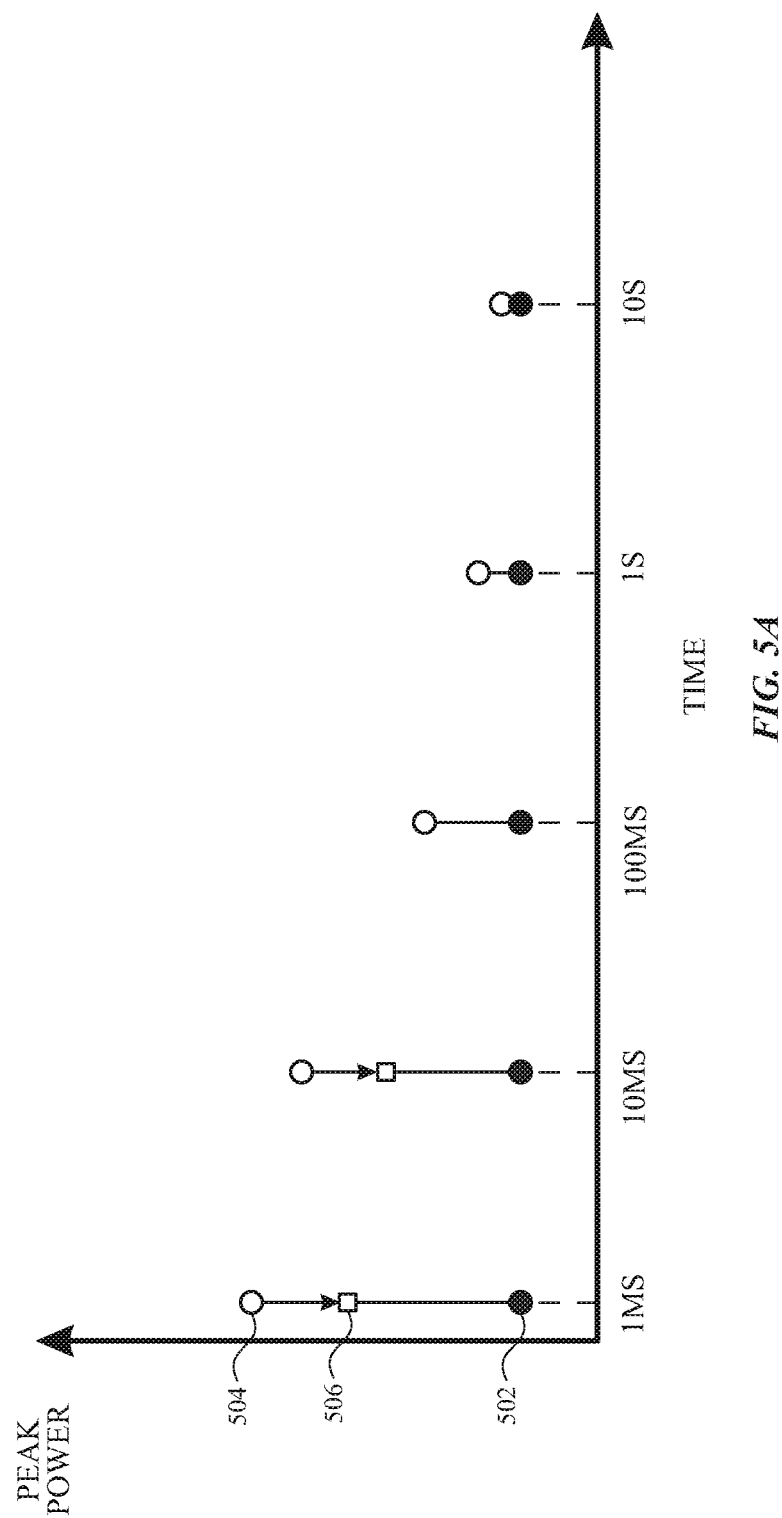

US 10,871,818 B1

COMPONENT POWER CONSUMPTION MANAGEMENT DETERMINING WHETHER THE POWER AVAILABILITY OF THE POWER SOURCE EXCEEDS THE EXPECTED POWER CONSUMPTION

CROSS-REFERENCE TO RELATED APPLICATIONS

This application claims priority to U.S. Provisional Patent Application Ser. No. 62/557,067, filed Sep. 11, 2017, which is hereby incorporated by reference in its entirety.

FIELD OF THE DISCLOSURE

This relates generally to power management of an electronic device.

BACKGROUND OF THE DISCLOSURE

An electronic device requires a power supply, e.g., mains electricity or a battery. It is important that the electronic device does not draw power in excess of its power supply, particularly when the device is under battery power. The ability of a battery to provide sufficient voltage/power is affected by factors such as temperature and the health of the battery. If a battery-powered electronic device draws more power than its battery can provide, droops in the battery's voltage will cause the device to brownout or shutdown. Neither is desirable in terms of user experience.

SUMMARY OF THE DISCLOSURE

Examples of the disclosure are directed to methods and apparatus for power management of an electronic device. In the examples described herein, the electronic device adjusts the power that it requires from the battery by modifying the power used by one or more electronic components of the electronic device. For example, the power use can be modified by reducing CPU load, CPU speed, GPU load, GPU speed, display brightness, speaker sound pressure level, wireless transmission (e.g., cellular, WiFi, so forth) power levels, storage activity, LAN activity, and/or other power-consuming activities performed by components of the electronic device. The electronic device can determine whether power adjustments are necessary by estimating the total power demand of the electronic components and comparing the estimated demand with a calculated power availability of the battery. If the estimated power consumption of the electronic components exceeds the ability of the battery to supply power, the power consumption of one of more of the electronic components is reduced to bring the expected power consumption within the ability of the battery to supply power. The electronic device updates it estimated power consumption levels periodically as operation of its electronic components changes (e.g., due to turning on or off, changing an operation mode, or changing an operation frequency). At any time if the estimated demand exceeds the calculated supply, the power consumption of one or more electronic components can be reduced. The remedial actions taken by the electronic device to maintain consumption within an available power envelope can be prioritized according to a power allocation policy. Some power allocation policies prioritize adjustments to components that are less likely to interference with a user's experience. For example, it is relatively unnoticeable to reduce WiFi transmission power levels when a user is taking a picture using the camera feature.

BRIEF DESCRIPTION OF THE DRAWINGS

FIG. 5A illustrates an exemplary demand estimate plot according to examples of the disclosure.

DETAILED DESCRIPTION

Figure 1:
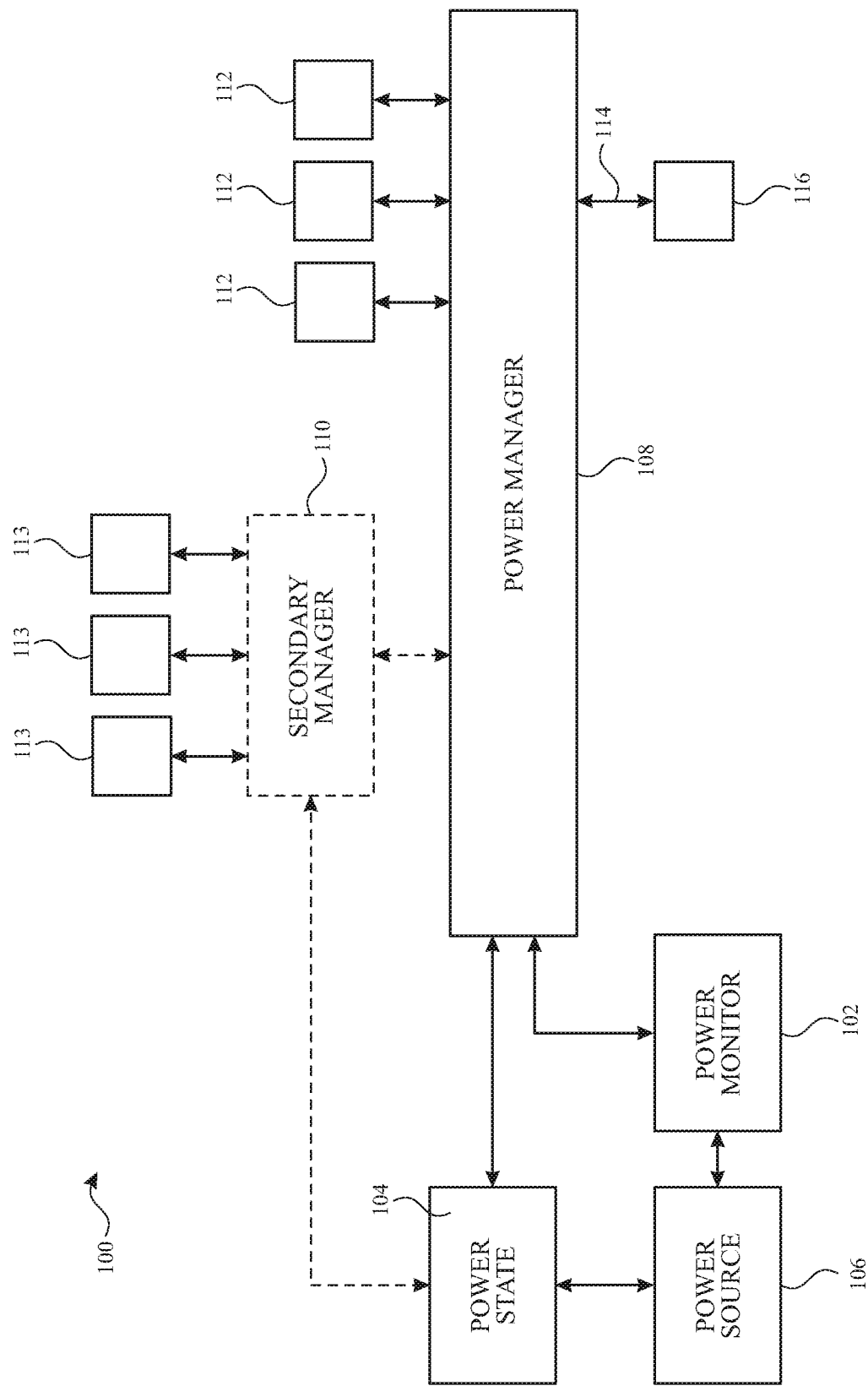
FIG. 1 illustrates an exemplary block diagram of a device 100 according to examples of the disclosure.

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

In the examples described herein, an electronic device performs power management by modifying the power used by one or more electronic components of the electronic device, thereby changing the power requirement on its power source (e.g., battery). For example, the power use can be modified by reducing CPU load, CPU speed, GPU load, GPU speed, display brightness, speaker sound pressure level, wireless transmission (e.g., cellular, WiFi, so forth) power levels, storage activity, LAN activity, and/or other power-consuming activities performed by one or more electronic components of the electronic device.

In some examples, the electronic device determines whether power adjustments are necessary by estimating the total power demand of the electronic components and comparing the estimated demand with a calculated power availability of the battery. If the estimated power consumption of the electronic components exceeds the ability of the battery to supply power, the power consumption of one of more of the electronic components is reduced to bring the expected power consumption within the ability of the battery to supply power. The electronic device updates it estimated power consumption levels periodically as operation of its electronic components changes (e.g., due to turning on or off, changing an operation mode, or changing an operation frequency). At any time if the estimated demand exceeds the calculated supply, the power consumption of one or more electronic components can be reduced. The remedial actions taken by the electronic device to maintain consumption within an available power envelope can be prioritized according to a power allocation policy. Some power allocation policies prioritize adjustments to components that are less likely to interference with a user's experience. For example, it is relatively unnoticeable to reduce WiFi transmission power levels when a user is taking a picture using the camera feature. Although the disclosure above described using estimated power consumption to maintain consumption within an available power envelope, the same principles can be applied where power consumption can be directly measured rather than estimated without departing from the scope of the present disclosure. Further, a hybrid system where the power consumption of some electronic components are directly measured while the power consumption of other electronic components are estimated may be used without departing from the scope of the present disclosure.

Although examples disclosed herein may be described and illustrated herein primarily in terms of an electronic device having a battery, it should be understood that the examples are not so limited, but are additionally applicable to devices including any kind of power supply, such as an alternating current (AC) power supply, a solar cell(s), and so forth.

FIG. 1 illustrates a block diagram of device 100 according to examples of the disclosure. In some examples, device 100 includes power monitor circuitry 102, power state circuitry 104, power source 106, power manager 108, optional secondary power manager 110, operational circuitry 112, and operational circuitry 113. In some examples, each of the power manager 108 can be implemented as software, e.g., as functions of an operating system for device 100. In some examples, power manager 108 can be implemented as an application specific integrated circuit (ASIC) and in some examples the power manager can be implemented in a programmable processor using firmware. In addition, in some examples when the power manager 108 is implemented as an ASIC or programmable processor, some of the functions described for the power manager below may need to be channeled through software (e.g., the operating system) of device 100 to access kernel level components such as CPUs, GPUs, storage, image sensor processors, and so forth. In some examples, the power manager can communicate with one or more application program interfaces (APIs) for communicating with the operational circuitry 112. The optional secondary power manager 110 can also be implemented in software, ASIC, or firmware on a programmable processor. The power manager 108 and secondary power manager 110 may each have a different implementation, or may both be implemented as software, hardware, or firmware. In one exemplary configuration, the power manager 108 is implemented as part of an operating system, thus allowing for low latency communication with kernel level components and the optional secondary power manager is implemented in firmware, where the operational circuitry 113 includes only user level components that do not require kernel level access. However, it should be understood that the implementation of power manager 108 and optional secondary power manager 110 can be changed without departing from the scope of the present disclosure.

Power source 106, which is a battery or AC-DC converter (e.g., a power brick) in the example of FIG. 1, powers power monitor circuitry 102 and power state circuitry 104. Power source 106 can store information about its age. In some examples, power source 106 can store its manufacturing date, the number of charge-discharge cycles (e.g., the number of times the battery is charged above a certain amount and subsequently discharged below another amount), the time since its first use (e.g., first charge after formation). In some examples, power source 106 can monitor the time the device operates above a threshold state of charge (e.g., 95% of charge). Prolonged operation of a battery at high states of charge, particularly close to 100% of charge) tends to accelerate aging of the battery. Power source 106 can also monitor the impedance of the battery. The impedance of the battery can cause a drop in the voltage/power output of the battery. As the battery gets older, the impedance of the battery can increase.

Power monitor circuitry 102 monitors power delivery from the power source 106 and provides information about the power delivery status to the power manager 108. Power monitor circuitry 102 can be implemented primarily as hardware, such as voltage regulator circuitry having output monitoring capability. In some examples, power monitor circuitry 102 monitors voltage of power source 106 and provides a voltage droop signal indicative of a supply voltage of electronic device 100 falling below a threshold level. A software interface such as a device driver (not shown) may optionally be provided between the power monitor circuitry 102 and the power manager 108. Inclusion of such a software interface can depend on the implementation of the power monitor 108 in hardware, software, firmware, or a combination thereof.

Power state circuitry 104 provides statistics about power source 106. In some examples, power state circuitry 104 provides statistics indicating an amount of power available for power source 106 to provide to the device 100 (e.g., a voltage level, a charge level, a steady state current, age, impedance, or some other measure(s) that relate to the remaining capacity of the battery). Power state circuitry can include hardware, software, and/or firmware components. For example, voltage level and charge level, and/or steady state current may be monitored by hardware, while information about age and impedance characteristics may be calculated from the hardware monitored data. In some examples, all of the power state circuitry functions can be performed in hardware, such as an ASIC. In some examples, the power state circuitry 104 provides statistics about the impedance of the power source 106 (as will be described in more detail below with regards to FIGS. 2-4 and 6) to the power manager 108. In some examples, the power state circuitry 104 provides statistics about the ability of the power supply 106 to supply power based on the temperature of the power supply 106. A software interface such as a device driver (not shown) may optionally be provided between the power state circuitry 104 and the power manager 108. Inclusion of such a software interface can depend on the implementation of the power monitor 108 in hardware, software, firmware, or a combination thereof.

Power manager 108 can further be coupled to operational circuitry 112 with a bidirectional communication interface. As will be described in more detail below, operational circuitry 112 can be configured to request power to perform operations. As will be discussed in more detail below, power manager 108 can be configured to allocate power to the operational circuitry 112 (and optional secondary manager 110) to ensure that the ability of the power supply 106 to provide the necessary power is not exceeded. Operational circuitry 112 can correspond to the electronic components of the device (e.g., display, speaker(s), memory, display, haptic engine, radio frequency communication interfaces, image processors, cameras, memory, CPU, GPU, etc.). Optional secondary manager 110 can provide power management for a subset of operational circuitry 113 that does not have power allocation directly controlled by the power manager 108. In some examples, the secondary manager 110 can appear identical to any other operational circuitry 112 from the perspective of power manager 108. In some examples, the secondary manager 110 can have a special interface (e.g., communicating the power needs of individual components) with the power manager 108 for managing power for the subset of operational circuitry 113. In some examples, the outputs of the power state circuitry 104 and the power monitor circuitry 102 (connection line not drawn) can also optionally be provided to the secondary manager 110. In some examples, the power manager 108 can also provide an output signal 114 to high level software 116 (e.g., the operating system) to indicate that the power delivery ability of the power supply 106 has been exceeded. In some examples, the high level software 116 may be able to reduce power that the power manager 108 cannot directly control.

Figure 2:
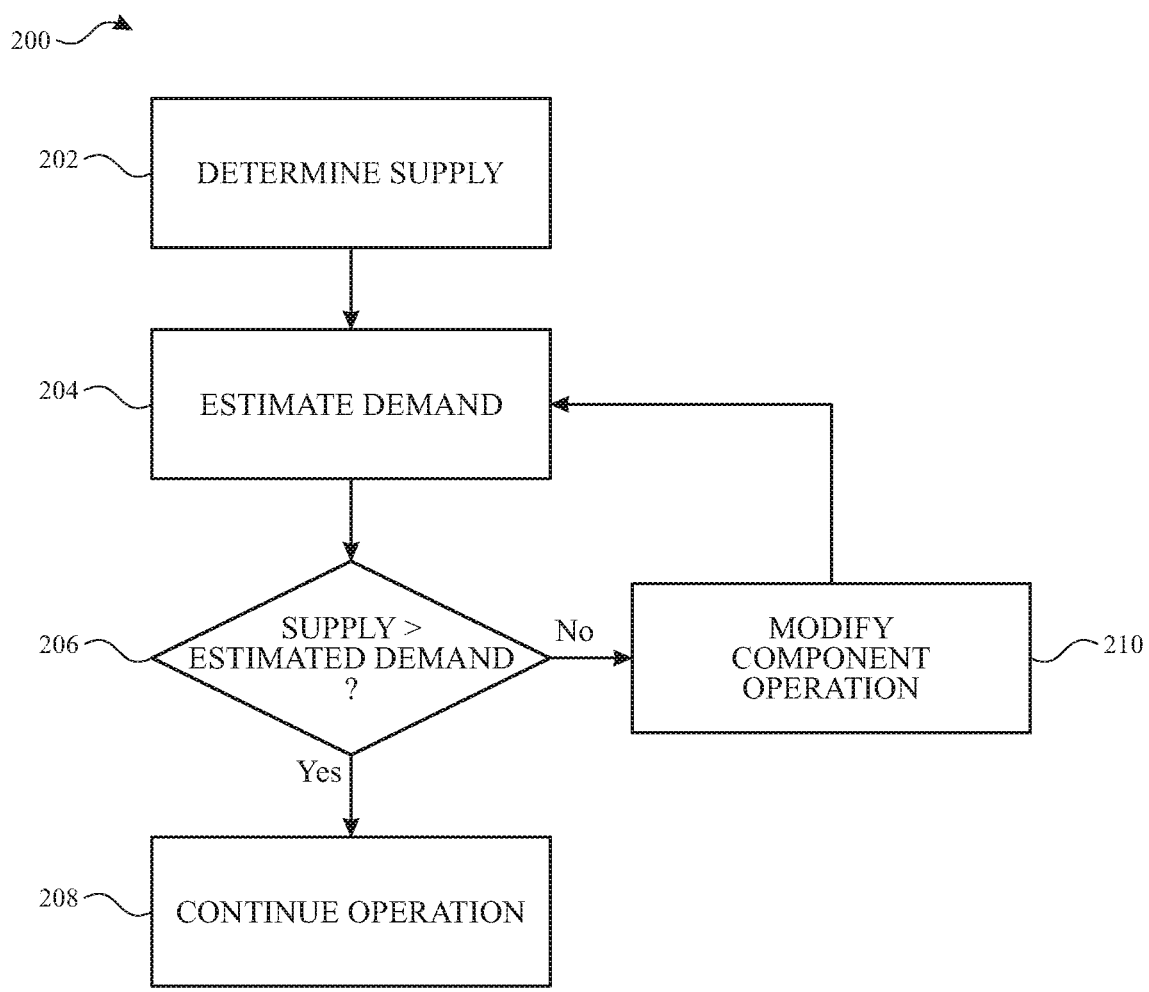
FIG. 2 illustrates an exemplary power management process for an electronic device according to examples of the disclosure.

FIG. 2 illustrates an exemplary power management process 200 for an electronic device according to examples of the disclosure. In some examples, a software controller can be configured to run process 200. In some examples, process 200 is implemented in power manager 108 of FIG. 1. In some examples, process 200 can be run at device start-up, continuously, and/or periodically.

At block 202, process 200 determines the power availability of the power supply (e.g., power supply 106 above). In some examples, block 202 can include utilizing statistics about the operational conditions of a battery. In some examples, process 200 can determine the power availability of the battery by determining one or more characteristics about the battery. In some examples, process 200 can determine the impedance of the battery at block 202. As will be explained in further detail below, process 200 can utilize multiple different impedance values for the battery corresponding to different time windows of power consumption at block 202. In some examples, process 200 can determine the age of the battery at block 202. Block 202 of process 200 can determine the age of the battery in numerous ways. For example, block 202 can look up the manufacturing date of the battery. In another example, block 202 can determine the age of the battery in terms of hours (e.g., the total number of hours since the device was powered on for the very first time). In another example, block 202 can determine the age of the battery by tracking the number of charge-discharge cycles (e.g., the number of times the battery is charged above a certain amount and subsequently discharged below another amount). In some examples, block 202 can determine the time the device operates above a threshold state of charge (e.g., 95% of charge) at block 202. This can represent the time the device has been used while connected to a power source. Operating a device at a high state of charge (e.g., 95% of the charge) can have detrimental effects on the battery. In some examples, the time determined at block 202 can be the total time (e.g., over the life of the device) that the device has ever been operated above the threshold. In other examples, the time determined at block 202 can be the duration of the last instance that the device was operated above the threshold. In some examples, block 202 can determine how many times the battery was discharged beyond a minimum discharge voltage (e.g., causing the device to shut down and/or enter a low power mode). At block 202, process 200 can determine the temperature of the battery. In some examples, the temperature of the device can also be determined. In some examples, the average temperature of the battery (e.g., since manufacture of the battery) is determined at block 202. At block 202, process 200 can determine the state of the charge of the battery (e.g., a voltage level, a charge level, or some other measure that may relate to the remaining capacity of the battery). As will be discussed in more detail below in relation to FIGS. 4-7B, the power availability of the power supply can be calculated for multiple time windows. For example, for short duration power spikes (e.g., lasting 0.1 s or less), the power delivery capability of a battery can be higher due to a lower effective impedance. On the other hand, long duration power consumption (e.g., lasting 10 s or more) can be subject to capacitive effects of battery impedance, and the ability to deliver power continuously can be lower. Accordingly, separate power availability values can be determined for different time windows such that the differences in power availability can be factored in to power allocation decisions. Block 202 can be repeated periodically to update the power availability of the power supply as power is consumed and/or any of the above listed statistics of the power supply vary over time.

At block 204, process 200 can estimate a power demand for electronic components of the device (e.g., operational circuitry 112/113). In some examples, block 204 can combine information about the operational state of each electronic component (e.g., on/off state, operation mode, low power/high power mode, etc.) to estimate a total demand value. In some examples, the requested power for each of the electronic components can be added together to determine the estimated demand. In other examples, a statistical approach can be taken to combining the requested power from each of the electronic components. For example, spike loads of a short duration (e.g., 0.1 s or less) are less likely to overlap than long duration power loads (e.g., 10 s or more). Accordingly, a direct sum of short duration loads can be overly pessimistic (e.g., potentially causing the process 200 to excessively throttle power). In some examples, a statistical model for the demand can be formed based on the likelihood of overlapping loads from the different electronic components. Similar to the power availability calculation at block 202, multiple different demand estimates corresponding to different time windows can be calculated at block 204. In some examples, the time window for calculating demand estimates at block 204 can be matched with the time windows for calculating power availability at block 202 above.

At block 206, process 200 can compare the power availability calculated at block 202 with the estimated demand calculated at block 204. In some examples, respective individual power availability values and estimated demand values associated with each time window can be compared individually (e.g., comparing 0.1 s estimated demand to 0.1 s power availability, comparing 1 s estimated demand to 1 s power availability, and so on). In some examples, if any of the estimated demand values exceeds any of the estimated supply values, block 206 can determine that the power availability of the power supply cannot support all of the requested loads for the electronic components simultaneously. In some examples, only a particular time window (e.g., short duration of 0.1 s or less) can be considered for determining whether the power availability is sufficient. If at block 206 process 200 determines that there is sufficient power availability to satisfy the estimated demand, process 200 can allow operation of the electronic components to continue at block 208 without making any modifications to the power allocation of the electronic components. If at block 206 process 200 determines that there is insufficient power availability to satisfy the estimated demand, process 200 can modify power allocation at block 210 for one or more of the electronic components. In some examples, modifying power allocation at block 210 can include reducing brightness of a display, operating a component in a reduced power mode, lowering a resolution of a camera, throttling a processor (e.g., a CPU or GPU), dimming a display, lowering a sound pressure level of a speaker, or similar modifications to an operating state of one or more electronic components. As will be discussed in more detail below with regards to FIGS. 7A-7B, the modified power allocation can be done according to a power allocation policy. In some examples, after the power allocation is modified at block 210, process 200 can return to block 204 to recalculate the estimated demand based on the modified allocation and can repeat the process until the power availability of the power supply calculated at block 202 is sufficient to satisfy the estimated demand calculated at block 204. In addition, each time an electronic component indicates a change in operational state (e.g., by sending a request to the program manager 108 above), the estimated demand can be recalculated at block 204 of process 200.

Figure 3:
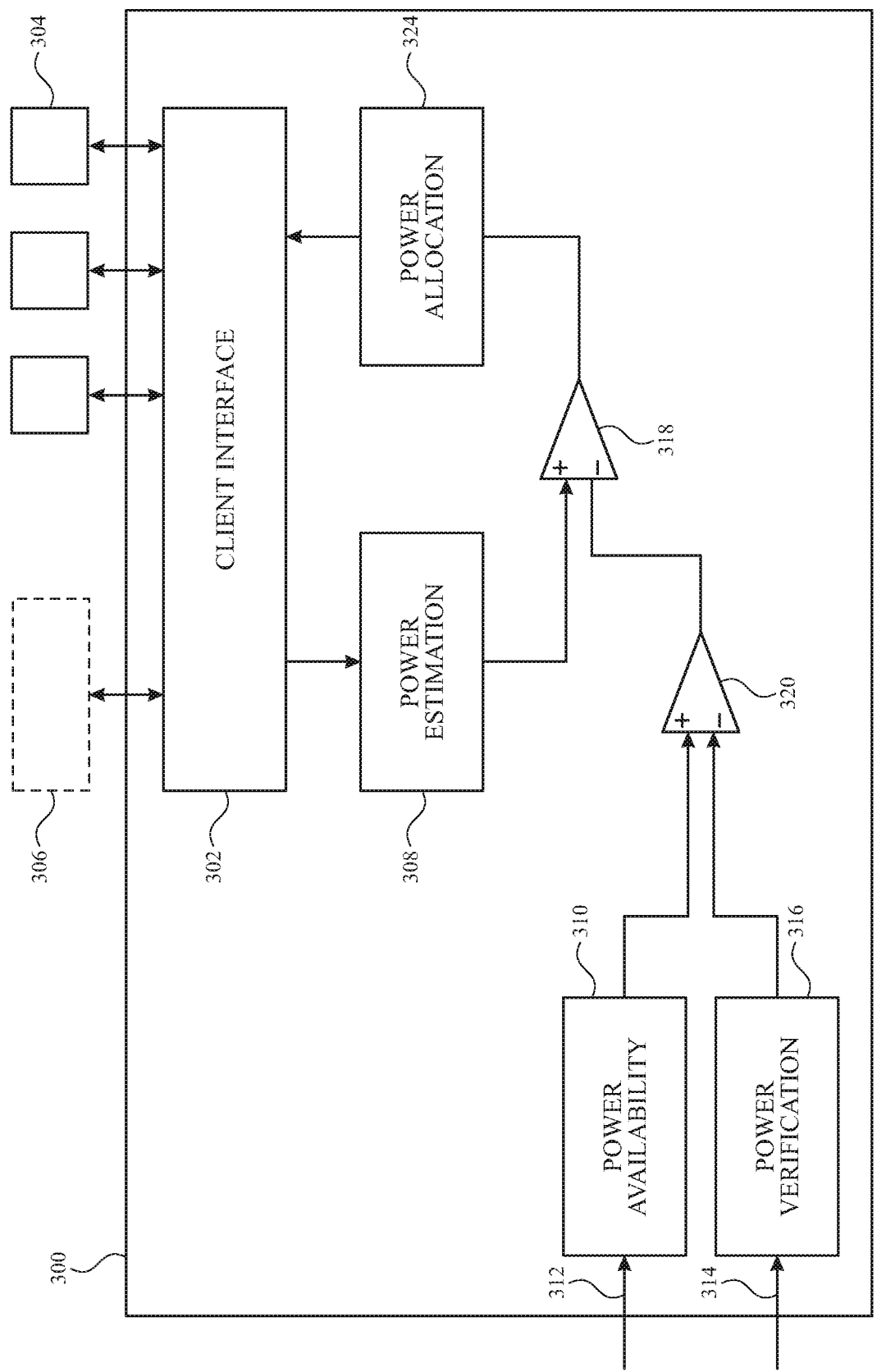
FIG. 3 illustrates an exemplary block diagram of a power manager according to examples of the disclosure.

FIG. 3 illustrates an exemplary block diagram of a power manager 300 according to examples of the disclosure. In some examples, the power manager 300 can correspond to power manager 108 in FIG. 1 above. Client interface 302 can include a plurality of communication lines between the power manager 300 and clients including electronic components 304 (e.g., operational circuitry 112 above) and an optional secondary power manager 306 (e.g., 110 above). For the purposes of the description below, the electronic components 304 and secondary power manager 306 will collectively be referred to as electronic components 304 for simplicity. In some examples, electronic components 304 share operational state information with the client interface. In some examples, operational state information can include whether the electronic component is powered on or off as well information about modes of operation such as brightness setting of a display, power density for a speaker driver, camera resolution, CPU load, CPU speed, GPU load, GPU speed, haptic feedback intensity, reduced power modes, full power modes, display brightness, speaker sound pressure level, wireless transmission (e.g., cellular, WiFi, so forth) power levels, storage activity, LAN activity, or any other operational state that may have an effect on power consumption. Based on the operational state information of the electronic components 304 received by the client interface 302, the power estimation block 308 can calculate an estimated power consumption envelope. In some examples, the power consumption associated with the operational states of each electronic component 304 can be pre-characterized (e.g., measured in a laboratory or manufacturing facility) and stored for use by the power estimation block 308. In some examples, the estimated power consumption envelope can be a sum of power consumption for each of the electronic components 304. In some examples, the sum of power consumption for each of the electronic components 304 can overestimate the power consumption of the electronic components, thus providing an overly conservative power allocation when more power is requested at the client interface 302. In some examples, the sum of power draw for each of the electronic components 304 can be derated (e.g., reduced by a scaling factor) to provide a less conservative estimate. In some examples, the power consumption of the electronic components 304 can be statistically combined based on temporal characteristics of the power consumption (e.g., whether the electronic component 304 consumes power in short spikes or for longer time periods) to provide a power estimate that can avoid excessive throttling of electronic components. As will be discussed in more detail below with regards to FIGS. 5-7B, the power consumption envelope can have different values associated with different time windows of power consumption. Power availability block 310 can receive power source statistics 312 (e.g., from power state block 104 above) to determine power availability of the power source (e.g., 106 above). In some examples, the power availability block 310 can utilize a parametric battery model to determine the power availability of the power source based on the power source statistics 312. As will be discussed in more detail below regarding FIG. 4, the power availability can be described by a power envelope that characterizes power availability for different time windows of power consumption. In some examples, the same time windows (e.g., 0.1 s, is and 10 s) can be used for calculating power availability at power availability block 310 and the estimated power consumption envelope at power estimation block 308. Power verification block 316 can be configured to receive a power monitoring signal 314 (e.g., from power monitor block 102) that can be used to directly verify that adequate power is available from the power supply. For example, if the power monitor signal 314 is a voltage droop signal indicative that a power supply voltage has fallen below a threshold value, the power verification block 316 can monitor the voltage droop signal at a relatively high rate (e.g., every 0.01 s) to verify the condition of the power supply voltage. In some examples, the power verification block can directly monitor the power supply in addition to or alternatively to monitoring a voltage droop signal. Comparison block 320 can receive the calculated power availability from power availability block 310 and the output of power verification block 316. If the output of power verification block 310 indicates a voltage droop or a low supply voltage, the output of comparison block 320 can be set to override a power availability check and immediately cause power allocation block 324 to reallocate power to the electronic components 304 (e.g., by reducing power of or throttling one of more of the electronic components). However, if the output of power verification block 316 indicates sufficient power availability from the power supply, the output of comparison block 320 can be the calculated power availability from power availability block 310. In the case where the output of comparison block 320 is the calculated power availability, comparison block 318 can be used to compare the calculated power availability from power availability block 310 and the estimated power consumption envelope from power estimation block 308. In some examples, the comparison block 318 can determine an amount of power consumption by which the estimated power consumption exceeds the power availability. In some examples, if the calculated power availability is greater than the estimated power consumption, the power allocation can be considered acceptable and power allocation block 324 can allow the electronic components to operate in the operational states that have been requested through the client interface 302. However, if the calculated power availability is less than the estimated power consumption, the power allocation block 324 can select one or more of the electronic components 304 for power reduction or throttling. The estimated power consumption from power estimation block 308 can be recalculated as operational state changes from the electronic components are received at the client interface 302. Similarly, the calculated power availability can be updated periodically (e.g., every 1 s) to capture changes in battery statistics (e.g., depletion of charge from the power supply, change in temperature, etc.). As determined from the comparisons at comparison block 320 and 318 described above, the power allocation block 324 can make adjustments to the power consumption of the electronic components 304 to keep the power consumption of the electronic device (e.g., device 100 above) within the limits of the power availability of the power supply. In some examples, the electronic component(s) 304 selected for power adjustment can be selected according to a power allocation policy that will be discussed in more detail below regarding FIGS. 7A-7B. As discussed more detail below regarding FIGS. 7A-7B, the amount that the estimated power consumption exceeds the power availability (e.g., as optionally determined at comparison block 318) can be used by a power allocation policy to determine which components to select for power reduction or throttling.

Figure 4:
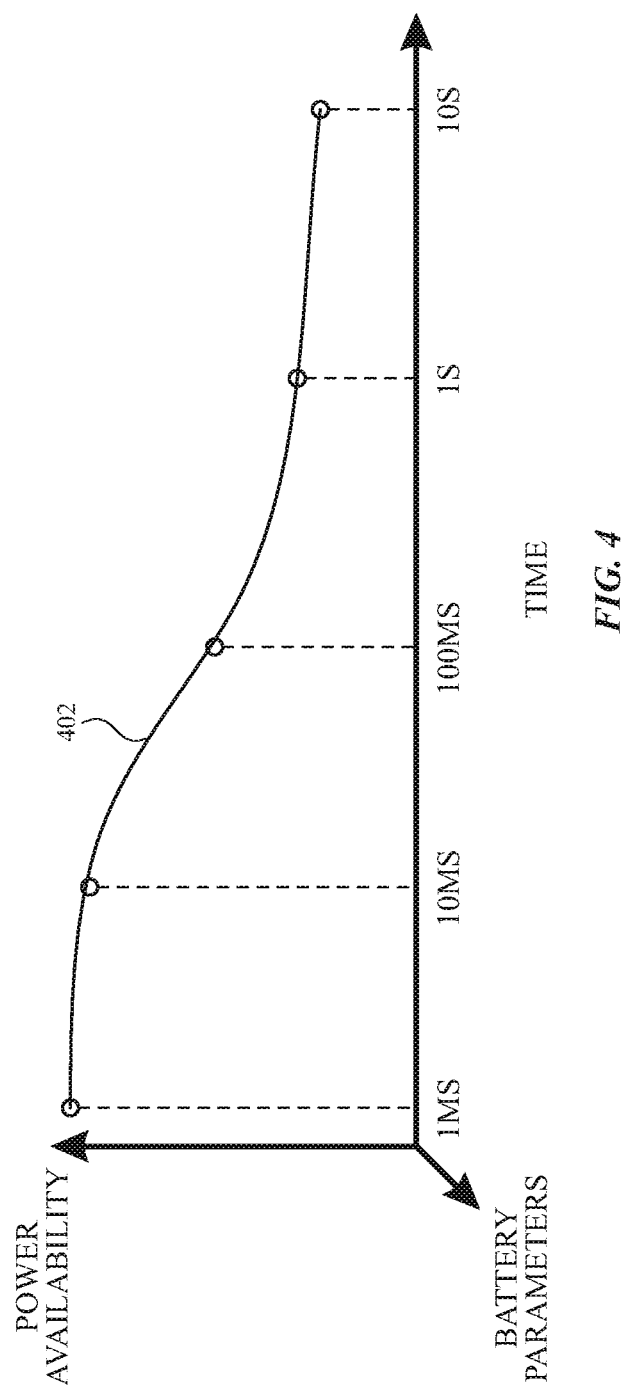
FIG. 4 illustrates an exemplary power availability envelope according to examples of the disclosure.

FIG. 4 illustrates an exemplary power availability envelope according to examples of the disclosure. As described above, a battery can have internal impedance that has different characteristics depending on a time window (e.g., duration) of a power draw. In some examples, a battery can have a much higher ability to delivery power for a short time window (e.g., spikes of 0.01 s or less), and the ability to deliver power can decrease as the time window increases (e.g., for 10 s or longer). In some examples, this variable impedance can result from a capacitive effect of the battery impedance. Curve 402 illustrates an example supply envelope for one set of battery parameter conditions. In some examples, curve 402 can be associated with a particular state of charge, steady state current, operating temperature, and estimate of internal impedance(s) for the battery. The illustrated curve 402 shows five discrete data values on the curve corresponding to 0.001 s, 0.01 s, 0.1 s, 1 s, and 10 s time windows illustrated by dashed lines and open circles along the curve. The length of each of the dashed lines can correspond to the power availability associated with the time window labeled on the time axis. In some examples, a set of power availability curves that varies for different values of one or more of the state of charge, steady state current, operating temperature and internal impedance of the battery can be used to provide a calculated power availability that is specific to the operating condition of the battery and can update as the condition of the battery changes during use (e.g., as charge is consumed or temperature changes). One or more values on the curve 402 can be used for determining whether the power availability of the power supply is sufficient to meet the estimated demand of electronic components as described above regarding FIG. 3 and as will be discussed in more detail below regarding FIGS. 6 and 7A-7B.

FIG. 5A illustrates an exemplary power consumption estimate plot according to examples of the disclosure. Five peak power values corresponding to the same time windows 0.001 s, 0.01 s, 0.1 s, 1 s, and 10 s as described in FIGS. 2-4 above are shown. In the illustrated example, the five peaks can correspond to the sum of power consumption by two electronic components (e.g., CPU and display) of an electronic device (e.g., device 100 above). The dotted line segments ending in a solid circle 502 can represent, for example, the demand values for the first electronic component for each of the time windows. As illustrated, the demand for the first load (e.g., a display) is the same for all of the time intervals (e.g., having no spikes in power consumption). The length of the line segments 502 can correspond to a pre-characterized power consumption for an operational state or mode of the first load (e.g., brightness setting for the display) as discussed above in regard to FIG. 3. The second load is represented by solid line segments ending in an empty circle 504, where the second load segments are shown added to the first load segments 502. Therefore, in the illustrated two load example, the empty circles 504 represent the estimated peak power consumption for the combined load of the two components for each of the time windows labeled on the time axis. As should be understood from the disclosure, an electronic device may have many more that two electronic components that can consume power and additional loads can be added in a similar fashion. A derated peak power consumption estimate 506 (shown by the downward arrows and empty squares) illustrates an optional derating of estimated peak power consumption for the 0.001 s and 0.01 s time windows. As discussed above, shorter duration power spikes can be less likely to occur simultaneously, and therefore a strict addition of all loads for shorter duration loads (e.g., 0.001 s and 0.01 s time windows) can be overly pessimistic regarding the amount of power that is likely to be consumed by the electronic components. In some examples, the derating the peak power estimate 504 to the derated peak can be calculated based on a scaling factor applied to the peak power estimate. In some examples, a statistic model for overlap of short duration loads can be used to determine an appropriate amount of derating.

Figure 5B:
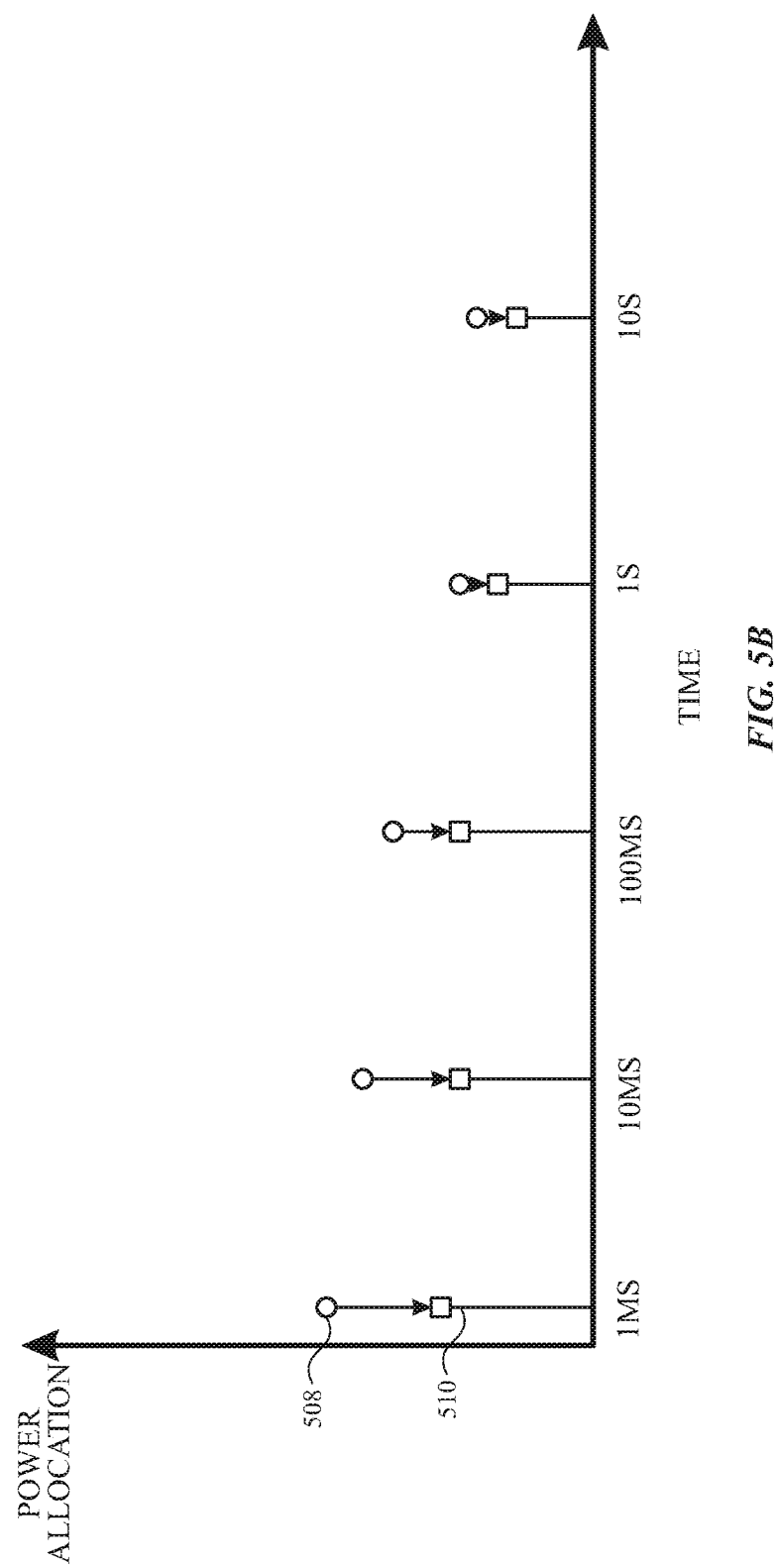
FIG. 5B illustrates an exemplary demand modification in response to an inability to provide sufficient power according to examples of the disclosure.

FIG. 5B illustrates an exemplary demand modification in response to an inability to provide sufficient power according to examples of the disclosure. In some examples, as discussed above, a monitoring signal can be used to detect when the power supply is unable to meet the present demand for power consumption by electronic components (e.g., operational circuitry 112/113 above) of an electronic device (e.g., 100 above). In some examples, the monitoring signal can be a voltage droop signal (e.g., 318 above) for a supply voltage of an electronic device. In some examples, the monitoring signal can be the supply voltage itself, and in some examples, both the voltage droop signal and the supply voltage can be used to determine when the power supply is unable to meet the present demand for power consumption. In some examples, the voltage droop signal and supply voltage can be monitored at the output of a voltage regulator of the electronic device that receives the power supply voltage (e.g., from power supply 106) as an input. The plot in FIG. 5B illustrates power allocations 508 corresponding to multiple time windows as discussed above in FIG. 5A based on an estimated demand that is less than the power availability of the power supply (e.g., curve 402 in FIG. 4 above). In some examples, the power allocations 508 (indicated by open circles) can correspond to the demand estimate using a simple sum (e.g., 504 above) or using a statistic derating model (e.g., 506 above). In either case, the present demand for power consumption may exceed the power availability of the power supply due to an underestimation of the estimated demand, an overestimation of the power availability, or both. In such a case, the monitoring signal (e.g., voltage droop or direct voltage measurement) can be used to alert the power manager (e.g., 108 above) that more power is being consumed that is available from the power supply. In some examples, when this occurs, the power manager can reduce power allocation to one or more electronic components until the monitoring signal indicates that sufficient power is available. The power allocations 510 (indicated by open squares) can represent the reduced power allocation values after modification by the power manager. Accordingly, a monitoring signal can be used by the power manager to verify and adjust the demand estimate and power allocation as illustrated in FIG. 5B.

Figure 6:
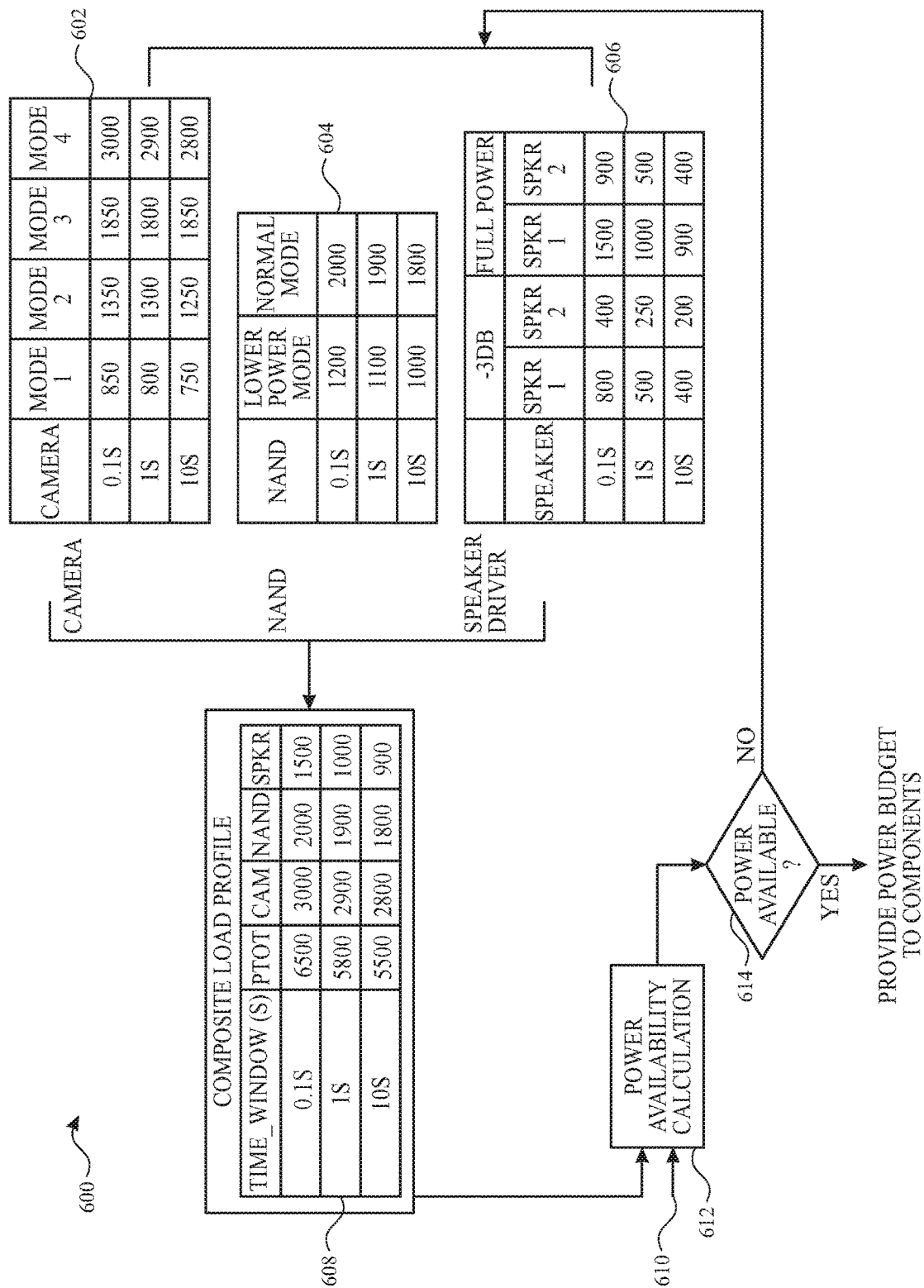
FIG. 6 illustrates an exemplary block diagram of a power manager according to examples of the disclosure.

FIG. 6 illustrates a second exemplary block diagram of a power manager (e.g., power manager 300 above) according to examples of the disclosure. Block diagram 600 illustrates with more detail an example load estimate calculation using three loads (e.g., a camera, NAND memory, and a speaker driver). Table 602 illustrates a table having power draw values (e.g., in milliwatts) for the camera. The table entries show four different operation modes 1-4, each having a value corresponding to the 0.1 s, is and 10 s time windows as discussed above regarding FIG. 5. Each of the modes 1-4 can correspond to, for example, front camera operation, rear camera operation, different camera resolutions and/or different frame rates. Similarly, table 604 illustrates exemplary power draw values (e.g., in milliwatts) for a NAND memory having a lower power mode and a normal power mode. As in table 602, table 604 includes power draw information for 0.1 s, 1 s, and 10 s time windows as discussed above regarding FIG. 5. Table 606 illustrates exemplary power draw values (e.g., in milliwatts) for a speaker driver that can drive a first speaker spkr1 and second speaker spkr2. In table 606, the exemplary power draw values for each speaker include a full power mode and a −3 dB power mode, each having a value corresponding to the 0.1 s, 1 s, and 10 s time windows as discussed above regarding FIG. 5. It should be understood that each of the power draw values in tables 602, 604, and 606 can be pre-characterized values determined for the particular electronic components and operation modes of the device. The characterization information can be selected according to the implementation of the power management algorithm. For example, if an algorithm was designed to calculate power management for more than three time windows or less than three time windows, a corresponding number of power draw values could be provided in each of the tables 602, 604, and 606. Table 608 illustrates a composite power draw profile for the three devices added together. The table shows the camera in mode 4, NAND memory in the normal mode, and speaker 1 being driven in the full power mode. The Ptot column in table 608 shows composite power values (e.g., in milliwatts) of each of the three electronic components for each of the time windows 0.1 s, 1 s, and 10 s. In some examples, the composite power values can be formed by performing a statistical combination of the power values for each individual active component and its corresponding mode obtained from the tables 602, 604, and 606. The statistical combination can be used to de-rate the estimated power consumption as described above regarding FIG. 5A. The illustrated values in table 608 show a direct summation of the power values for each of the electronic components (e.g., camera, NAND memory, and speaker driver) for simplicity of illustration. As explained above, if more or fewer time windows are used by the power management algorithm, the table 608 can have a corresponding number of values (e.g., more or fewer rows) for Ptot. In the example block diagram 600, the three composite values from table 608 corresponding to each time window (e.g., 0.1 s, 1 s, and 10 s) can be input into a power availability calculation block 612. In some examples, the power availability calculation block 612 can receive information about the power availability of the power supply 610 and perform a calculation to determine whether there is sufficient power to satisfy the estimated power consumption of the electronic device (e.g., as shown in table 608). In some examples, the power availability calculation block 612 can determine how largely the estimated power consumption exceeds the power availability of the power supply. In some examples, the power availability calculation block 612 can perform the functions described for comparison blocks 320 and 318 above. In some examples, the power allocation block can make binary determination about whether there is sufficient power. If power allocation block 614 (which can correspond to power allocation block 324 above) determines that sufficient power is available, the power allocation block can provide the requested power budget to the electronic components (e.g., the camera, NAND memory, and speaker driver). Alternatively, if the power allocation block 614 determines that sufficient power is not available, one or more of the components can be throttled to reduce the power consumption. For example, the NAND memory could be placed into a lower power mode, and the power consumption for each time window could correspondingly be lowered. In this example, the lower power mode of the NAND memory may be selected because it may go unnoticed by the user, while changing an operating mode of the camera or reducing speaker volume may be noticed. Thus, the power re-allocation can be performed without significantly degrading a user experience. In some examples, selecting the electronic component(s) for power reduction can be performed according to a power allocation policy as will be described in more detail below regarding FIGS. 7A-7B. As discussed more detail below regarding FIGS. 7A-7B, the amount that the estimated power consumption exceeds the power availability (e.g., as optionally determined at power availability calculation mode 612) can be used by a power allocation policy to determine which components to select for power reduction or throttling.

Figures 7A, 7B:
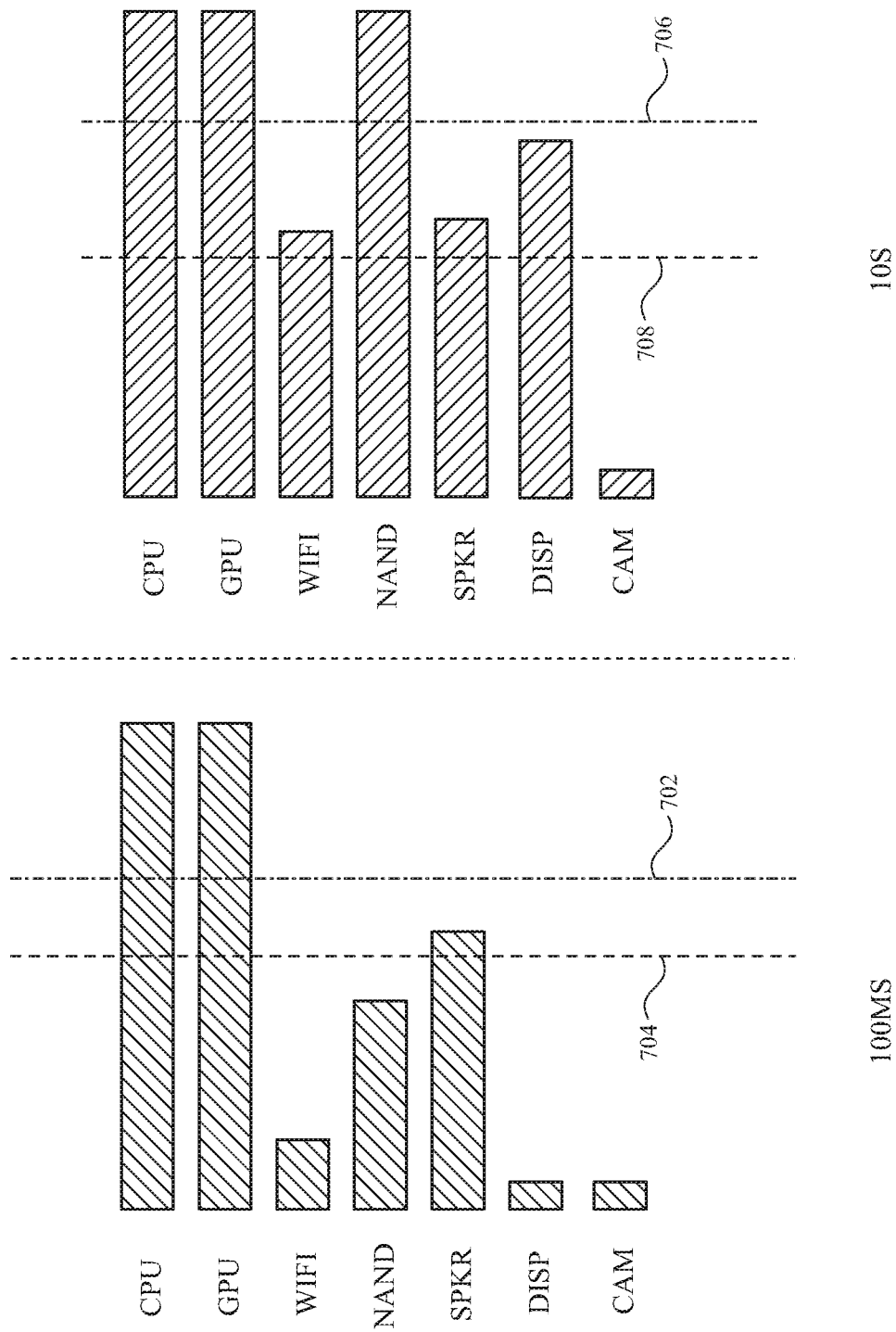
FIGS. 7A-7B illustrate exemplary graphical representations of power allocation policy for electronic components of an electronic device according to examples of the disclosure.

FIGS. 7A-7B illustrate exemplary graphical representations of power allocation policy for electronic components of an electronic device (e.g., device 100 above) according to examples of the disclosure. FIG. 7A illustrates a first power allocation policy that can correspond to a policy for a short time envelope (e.g., <0.1 s) according to examples of the disclosure. Each power allocation policy can be used by the power manager (e.g., 108 and 324 above). Each row in FIG. 7A can correspond to a priority for throttling electronic components. In some examples, longer horizontal bars can correspond to a high priority for throttling, while short horizontal bar can correspond to a low priority for throttling. In the example allocation policy for a 0.1 s time window, the CPU, GPU, NAND memory and speaker driver have relatively high priority for throttling, while the WIFI, display, and camera have low priority for throttling. A first exemplary reason for giving a low priority to the display for the 0.1 s time window can be that frequent brightness changes for the display would result in a noticeable change in user experience. For some electronic components, such as a camera, changing a mode may not make sense from a functional standpoint. For example, switching the camera from a front facing mode (that can have a lower power consumption) when the user intends to user the rear facing camera may not be a viable solution for power saving. In addition, a second exemplary reason for a reduced priority can be a response time (e.g., latency) for reducing power after receiving a throttling request from the power manager. For example, a throttling request for WiFi may have a 500 ms response time, and may not occur quickly enough to address a potential excess power consumption that lasts only 0.1 s. Electronic components having the highest priority for throttling, such as the CPU and GPU in FIG. 7A for the 0.1 s time window may have the characteristics of a sufficiently low latency for throttling and a low impact on user experience. It should be noted that although a particular electronic component (e.g., speaker driver) may have a relatively high priority for throttling, that particular component may already in a powered off state (e.g., sound is muted). In such a scenario, throttling the electronic component that is off may have no effect on power consumption, and thus the component can be excluded from consideration for throttling. If the same component is in a powered on state at a different time, the component may again be considered for throttling according to the power allocation policy.

FIG. 7A includes a representation of a power allocation threshold 702 (represented by a vertical dashed line) for a particular power usage condition. In some examples, if the priority for throttling an electronic component is greater than the power allocation threshold 702 (e.g., the bar corresponding to the component extends beyond dashed line) then the component can be considered for throttling. In some examples, if none of the devices above the power allocation threshold 702 are available for throttling, the power allocation threshold can be reduced until a component that can be throttled is identified. In one example the CPU and GPU may be unavailable for throttling and the speaker may be in the powered on state. In such an example, power allocation threshold 702 could be adjusted until a suitable component having a priority higher than the adjusted power allocation threshold 704 (represented by a vertical dotted line), such as the speaker, can be selected for throttling. In some examples, an initial value for the power allocation threshold 702 can have a first static value any time the expected power consumption exceeds the power availability of the power supply. In some examples, a second, different static value for the power allocation threshold 702 can be used when power throttling is indicated by monitoring of the monitoring signal (e.g., voltage droop or direct voltage measurement as described above). In some examples, an initial value for the power allocation threshold 702 can depend on how much power demand exceeds the power delivery availability of the power supply (e.g., as determined at comparison block 318 or power availability calculation 612 above).

FIG. 7B illustrates a second power allocation policy that can correspond to a policy for a long time envelope (e.g., >10 s) according to examples of the disclosure. The rows and horizontal bars have the same meaning as in FIG. 7A, but as should be readily apparent the length of the bars for the WiFi, NAND, speaker, and display have been increased. As should be understood from the description above, the increased length in of bars for the above listed electronic components indicates an increased availability for throttling of those components for the longer time window of 10 s. In the example of the display, reducing the brightness of the display over a relatively long duration can have a reduced impact on a user experience and thus the priority for throttling the display in the 10 s time window can be increased. In should be noted that in some examples the display in particular may be maintained at a reduced brightness setting until the electronic device is reset or connected to a charging cable so that the user does not experience repeated increases and decreases in display brightness during operation. In the example of the WiFi, the increased length of the time envelope to 10 s can reduce the effect that latency associated with reducing power of the WiFi has on effectively addressing the power consumption in excess of power availability.

FIG. 7B includes a representation of a power allocation threshold 706 (represented by a vertical dashed line) for a particular power usage condition. In some examples, if the priority for throttling an electronic component is greater than the power allocation threshold 706 (e.g., the bar corresponding to the component extends beyond dashed line) then the component can be considered for throttling. In some examples, if none of the devices above the power allocation threshold 706 are available for throttling, the power allocation threshold can be reduced until a component that can be throttled is identified. In one example the CPU, GPU may be unavailable for throttling and the speaker may be in the powered on state. In such an example, power allocation threshold 706 could be adjusted until a suitable component having a priority higher than the adjusted power allocation threshold 708 (represented by a vertical dotted line), such as the speaker, can be selected for throttling. In some examples, an initial value for the power allocation threshold 706 can have a first static value any time the estimated power consumption exceeds the power availability of the power supply. In some examples, a second, different static value for the power allocation threshold 706 can be used when power throttling is indicated by monitoring of the monitoring signal (e.g., voltage droop or direct voltage measurement as described above). In some examples, an initial value for the power allocation threshold 706 can depend on how much estimated power consumption exceeds the power delivery availability of the power supply (e.g., as determined at 612).

Figure 8:
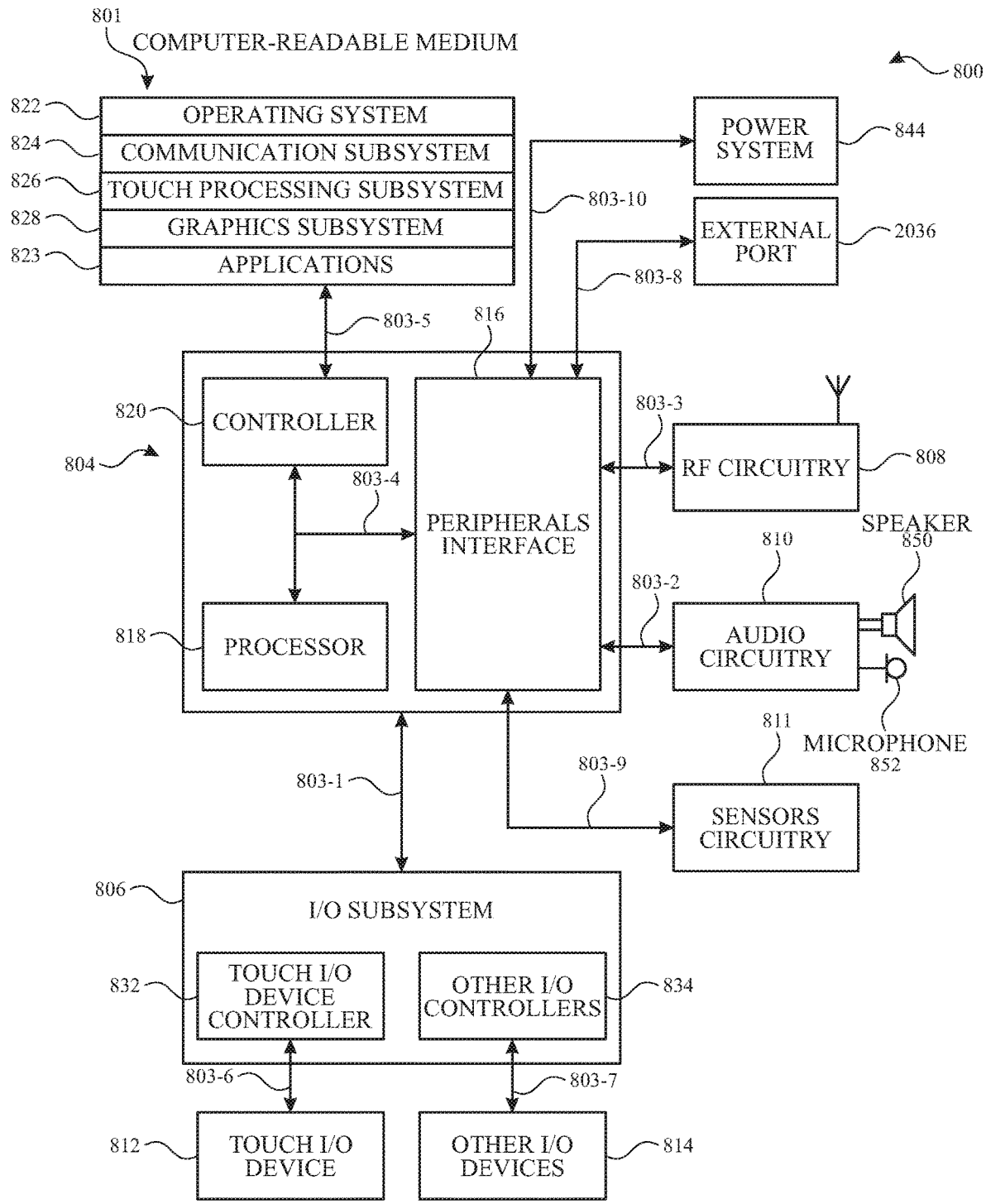
FIG. 8 illustrates a block diagram of an example system according to examples of the disclosure.

Attention is now directed towards examples of a system architecture that may be embodied within any portable or non-portable electronic device according to the examples of the disclosure, including, but not limited to, a communication device (e.g., a mobile phone or smart phone), a multimedia device (e.g., an MP3 player, TV, or radio), a portable or handheld computer (e.g., a tablet, netbook, or laptop), a desktop computer, an All-In-One desktop, a peripheral device, a wearable device (e.g., a smart watch) or any other system or device adaptable to the inclusion of system architecture 800, including combinations of two or more of these types of devices. FIG. 8 illustrates a block diagram of one example of system 800 that generally includes one or more computer-readable mediums 801, processing system 804, I/O subsystem 806, radio frequency (RF) circuitry 808, audio circuitry 810, sensors circuitry 811, and power system 844. These components may be coupled by one or more communication buses or signal lines 803.

It should be apparent that the architecture shown in FIG. 8 is only one example architecture of system 800, and that system 800 could have more or fewer components than shown, or a different configuration of components. The various components shown in FIG. 8 can be implemented in hardware, software, firmware or any combination thereof, including one or more signal processing and/or application specific integrated circuits. System 800 can correspond to the electronic device in which the power management functions of the disclosure are implemented.

RF circuitry 808 can be used to send and receive information over a wireless link or network to one or more other devices and includes well-known circuitry for performing this function. RF circuitry 808 and audio circuitry 810 can be coupled to processing system 804 via peripherals interface 816. Interface 816 can include various known components for establishing and maintaining communication between peripherals and processing system 804. Audio circuitry 810 can be coupled to audio speaker 850 and microphone 852 and can include known circuitry for processing voice signals received from interface 816 to enable a user to communicate in real-time with other users. In some examples, audio circuitry 810 can include a headphone jack (not shown). Sensors circuitry 811 can include, including, without limitation, one or more light emitting diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like. In some examples, one or more sensors of the sensors circuitry

811, such as the systems sensors which can sense remaining battery life and power consumption can be incorporated into and/or coupled to the power monitor circuitry 102 and/or power state circuitry 104.

Peripherals interface 816 can couple the input and output peripherals of the system to processor 818 and computer-readable medium 801. One or more processors 818 communicate with one or more computer-readable mediums 801 via controller 820. Computer-readable medium 801 can be any device or medium that can store code and/or data for use by one or more processors 818. In some examples, medium 801 can be a non-transitory computer-readable storage medium. Medium 801 can include a memory hierarchy, including, but not limited to, cache, main memory, and secondary memory. The memory hierarchy can be implemented using any combination of RAM (e.g., SRAM, DRAM, or DDRAM), ROM, FLASH, magnetic and/or optical storage devices, such as disk drives, magnetic tape, CDs (compact discs) and DVDs (digital video discs). Medium 801 may also include a transmission medium for carrying information-bearing signals indicative of computer instructions or data (with or without a carrier wave upon which the signals are modulated). For example, the transmission medium may include a communications network, including, but not limited to, the Internet (also referred to as the World Wide Web), intranet(s), Local Area Networks (LANs), Wide Local Area Networks (WLANs), Storage Area Networks (SANs), Metropolitan Area Networks (MANs) and the like.

One or more processors 818 can run various software components stored in medium 801 to perform various functions for system 800. In some examples, the software components can include operating system 822, communication subsystem (or set of instructions) 824, touch processing subsystem (or set of instructions) 826, graphics subsystem (or set of instructions) 828, and one or more applications (or set of instructions) 830. Each of these subsystems and above-noted applications can be involved with performing one or more of the power management functions described above and the methods described in this application (e.g., the computer-implemented methods and other information processing methods described herein). In some examples, the power manager 108 can be implemented in the operating system 822, and can interface with other subsystems and above noted applications for performing the power management functions described above in the disclosure. These subsystems (i.e., sets of instructions) need not be implemented as separate software programs, procedures or subsystems, and thus various subsets of these subsystems may be combined or otherwise rearranged in various examples. In some examples, medium 801 may store a subset of the subsystems and data structures identified above. Furthermore, medium 801 may store additional subsystems and data structures not described above.

Operating system 822 can include various procedures, sets of instructions, software components and/or drivers for controlling and managing general system tasks (e.g., memory management, storage device control, or power management) and facilitates communication between various hardware and software components.

Communication subsystem 824 can facilitate communication with other devices over one or more external ports 836 or via RF circuitry 808 and can include various software components for handling data received from RF circuitry 808 and/or external port 836.

Graphics subsystem 828 can include various known software components for rendering, animating, and displaying graphical objects on a display surface. In examples in which touch I/O device 812 is a touch sensing display (e.g., touch screen), graphics subsystem 828 can include components for rendering, displaying, and animating objects on the touch sensing display.

One or more applications 830 can include any applications installed on system 800, including, without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player).

Touch processing subsystem 826 can include various software components for performing various tasks associated with touch I/O device 812, including, but not limited to, receiving and processing touch input received from I/O device 812 via touch I/O device controller 832.

I/O subsystem 806 can be coupled to touch I/O device 812 and one or more other I/O devices 814 for controlling or performing various functions. Touch I/O device 812 can communicate with processing system 804 via touch I/O device controller 832, which can include various components for processing user touch input (e.g., scanning hardware). One or more other input controllers 834 can receive/send electrical signals from/to other I/O devices 814. Other I/O devices 814 may include physical buttons, dials, slider switches, sticks, keyboards, touch pads, additional display screens, or any combination thereof.

If embodied as a touch screen, touch I/O device 812 can display visual output to the user in a graphical user interface (GUI). The visual output may include text, graphics, video, and any combination thereof. Some or all of the visual output may correspond to user-interface objects. Touch I/O device 812 can form a touch sensing surface that accepts touch input from the user. Touch I/O device 812 and touch screen controller 832 (along with any associated subsystems and/or sets of instructions in medium 801) can detect and track touches or near touches (and any movement or release of the touch) on touch I/O device 812 and can convert the detected touch input into interaction with graphical objects, such as one or more user-interface objects. In the case in which device 812 is embodied as a touch screen, the user can directly interact with graphical objects that are displayed on the touch screen. Alternatively, in the case in which device 812 is embodied as a touch device other than a touch screen (e.g., a touch pad), the user may indirectly interact with graphical objects that are displayed on a separate display screen embodied as I/O device 814.

Touch I/O device 812 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples in which touch I/O device 812 is a touch screen, the touch screen may use liquid crystal display (LCD) technology, light emitting polymer display (LPD) technology, organic light emitting diode (OLED), or organic electro luminescence (OEL), although other display technologies may be used in other examples.

Feedback may be provided by touch I/O device 812 based on the user's touch input as well as a state or states of what is being displayed and/or of the computing system. Feedback may be transmitted optically (e.g., by light signal or displayed image), mechanically (e.g., by haptic feedback, touch feedback, force feedback, or the like), electrically (e.g., by electrical stimulation), olfactory, acoustically (e.g., by beep or the like), or by similar means or any combination thereof and in a variable or non-variable manner.

System 800 can also include power system 844 for powering the various hardware components of system 800 and may include a power management system, one or more power sources (e.g., a battery), a recharging system, a power failure detection circuit, a power converter or inverter, a power status indicator, and any other components typically associated with the generation, management, and distribution of power in portable devices. In some examples, the logic and/or circuitry for performing the power management functions of the disclosure can be included in power system 844, which can be communicatively coupled via link 803-10 to the remainder of system 800. Accordingly, one or more of power manager 108, power monitor circuitry 102, and power state circuitry 104, or portions thereof, may be included in power system 844.

In some examples, peripherals interface 816, one or more processors 818, and memory controller 820 may be implemented on a single chip, such as processing system 804. In some other examples, they may be implemented on separate chips.

Thus, according to the above, some examples of the disclosure are directed to an electronic device comprising: a power source, a plurality of electronic components configured to draw power from the power source, and a power manager configured to: receive information representing power availability of the power source, receive an indication of a requested change in an operational state for a first electronic component of the plurality of electronic components, based on the received indication of the requested change in operational state for the first electronic component, generate an expected power consumption estimate for the plurality of electronic components, determine whether the power availability of the power source exceeds the expected power consumption estimate, and in accordance with a determination that the power availability of the power source exceeds the expected power consumption estimate: allow the change in the operational state for the first electronic component to occur and maintain a current operational state for a second electronic component of the plurality of electronic components, and in accordance with a determination that the power availability of the power source does not exceed the expected power consumption estimate: allow the change in the operational state for the first electronic component and change an operational state of the second electronic component. Additionally or alternatively to one or more of the examples disclosed above, in some examples, the power manager is further configured to: receive a signal indicative of an ability of the power supply to supply a present power consumption of the plurality of electronic components; and in accordance with a determination that the power supply is unable to supply the present power consumption, change an operational state of at least one of the plurality of electronic components. Additionally or alternatively to one or more of the examples disclosed above, in some examples, the signal indicative of an ability of the power supply to supply a present power consumption is a voltage droop signal. Additionally or alternatively to one or more of the examples disclosed above, in some examples, the expected power consumption estimate is increased in accordance with the determination that the power supply is unable to meet the present demand. Additionally or alternatively to one or more of the examples disclosed above, in some examples, the power manager is further configured to: in accordance with the determination that the power availability of the power source does not exceed the expected power consumption estimate: determine an expected duration of power consumption for the change in operational state of the first electronic component; and select the second electronic component for a reduced power operational state wherein a latency associated with achieving the reduced power operational state of the second electronic component does not exceed the expected duration of power consumption by the first electronic component. Additionally or alternatively to one or more of the examples disclosed above, in some examples, changing the operational state of the second electronic component comprises throttling a processor, dimming a display or reducing a speaker sound pressure level. Additionally or alternatively to one or more of the examples disclosed above, in some examples, changing the operational state of the second electronic component comprises throttling a processor. Additionally or alternatively to one or more of the examples disclosed above, in some examples, changing the operation state of the second electronic component comprises throttling operation of a wireless transceiver or changing an operational mode of the wireless transceiver into a reduced power mode. Additionally or alternatively to one or more of the examples disclosed above, in some examples, generating the expected power consumption profile comprises combining power consumption models associated with the plurality of electronic components wherein each power consumption model includes information about an operational state of a corresponding electronic component. Additionally or alternatively to one or more of the examples disclosed above, in some examples, determining whether the power availability of the power source exceeds the expected power consumption estimate comprises determining whether the power source can provide a threshold power output for a time duration. Additionally or alternatively to one or more of the examples disclosed above, in some examples, determining whether the power availability of the power source exceeds the expected power consumption estimate comprises: determining whether the power source can provide a first power output for a first time duration; and determining whether the power source can provide a second power output for a second time duration, wherein the second time duration is greater than the first time duration and the first power output is greater than the second power output.

Some examples of the disclosure are directed to a method comprising: receiving information representing power availability of a power source, receiving an indication of a requested change in an operational state for a first electronic component of a plurality of electronic components, based on the received indication of the requested change in operational state for the first electronic component, generating an expected power consumption estimate for the plurality of electronic components, determining whether the power availability of the power source exceeds the expected power consumption estimate, and in accordance with a determination that the power availability of the power source exceeds the expected power consumption estimate: allowing the change in the operational state for the first electronic component to occur and maintain a current operational state for a second electronic component of the plurality of electronic components, and in accordance with a determination that the power availability of the power source does not exceed the expected power consumption estimate: allowing the change in the operational state for the first electronic component and changing an operational state of the second electronic component. Additionally or alternatively to one or more of the examples disclosed above, in some examples, the power manager is further configured to: receive a signal indicative of an ability of the power supply to supply a present power consumption of the plurality of electronic components; and in accordance with a determination that the power supply is unable to supply the present power consumption, change an operational state of at least one of the plurality of electronic components. Additionally or alternatively to one or more of the examples disclosed above, in some examples, the signal indicative of an ability of the power supply to supply a present power consumption is a voltage droop signal. Additionally or alternatively to one or more of the examples disclosed above, in some examples, the expected power consumption estimate is increased in accordance with the determination that the power supply is unable to meet the present demand. Additionally or alternatively to one or more of the examples disclosed above, in some examples, the power manager is further configured to: in accordance with the determination that the power availability of the power source does not exceed the expected power consumption estimate: determine an expected duration of power consumption for the change in operational state of the first electronic component; and select the second electronic component for a reduced power operational state wherein a latency associated with achieving the reduced power operational state of the second electronic component does not exceed the expected duration of power consumption by the first electronic component. Additionally or alternatively to one or more of the examples disclosed above, in some examples, changing the operational state of the second electronic component comprises throttling a processor, dimming a display or reducing a speaker sound pressure level. Additionally or alternatively to one or more of the examples disclosed above, in some examples, changing the operational state of the second electronic component comprises throttling a processor. Additionally or alternatively to one or more of the examples disclosed above, in some examples, changing the operation state of the second electronic component comprises throttling operation of a wireless transceiver or changing an operational mode of the wireless transceiver into a reduced power mode. Additionally or alternatively to one or more of the examples disclosed above, in some examples, generating the expected power consumption profile comprises combining power consumption models associated with the plurality of electronic components wherein each power consumption model includes information about an operational state of a corresponding electronic component. Additionally or alternatively to one or more of the examples disclosed above, in some examples, determining whether the power availability of the power source exceeds the expected power consumption estimate comprises determining whether the power source can provide a threshold power output for a time duration. Additionally or alternatively to one or more of the examples disclosed above, in some examples, determining whether the power availability of the power source exceeds the expected power consumption estimate comprises: determining whether the power source can provide a first power output for a first time duration; and determining whether the power source can provide a second power output for a second time duration, wherein the second time duration is greater than the first time duration and the first power output is greater than the second power output.

Some examples of the disclosure are directed to a non-transitory computer readable storage medium storing one or more programs, the one or more programs comprising instructions, which when executed by a processor cause the processor to perform a method comprising: receiving information representing power availability of a power source, receiving an indication of a requested change in an operational state for a first electronic component of a plurality of electronic components, based on the received indication of the requested change in operational state for the first electronic component, generating an expected power consumption estimate for the plurality of electronic components, determining whether the power availability of the power source exceeds the expected power consumption estimate, and in accordance with a determination that the power availability of the power source exceeds the expected power consumption estimate: allowing the change in the operational state for the first electronic component to occur and maintain a current operational state for a second electronic component of the plurality of electronic components, and in accordance with a determination that the power availability of the power source does not exceed the expected power consumption estimate: allowing the change in the operational state for the first electronic component and changing an operational state of the second electronic component. Additionally or alternatively to one or more of the examples disclosed above, in some examples, the method further comprises: receiving a signal indicative of an ability of the power supply to supply a present power consumption of the plurality of electronic components; and in accordance with a determination that the power supply is unable to supply the present power consumption, changing an operational state of at least one of the plurality of electronic components. Additionally or alternatively to one or more of the examples disclosed above, in some examples, the signal indicative of an ability of the power supply to supply a present power consumption is a voltage droop signal. Additionally or alternatively to one or more of the examples disclosed above, in some examples, a power allocation budget for the plurality of electronic components is decreased in accordance with the determination that the power supply is unable to meet the present demand. Additionally or alternatively to one or more of the examples disclosed above, in some examples, the method further comprises: in accordance with the determination that the power availability of the power source does not exceed the expected power consumption estimate: determining an expected duration of power consumption for the change in operational state of the first electronic component; and selecting the second electronic component for a reduced power operational state wherein a latency associated with achieving the reduced power operational state of the second electronic component does not exceed the expected duration of power consumption by the first electronic component.

Some examples of the disclosure are directed to An electronic device comprising: a power source, a plurality of electronic components configured to draw power from the power source, and a power manager configured to: receive information representing power availability of the power source, receive an indication of a change in power source conditions indicative of a change in a power availability of the power source, based on the received indication of the change in power source conditions indicative of a change in the power availability of the power source, calculate the power availability of the power source and generate an expected power consumption estimate for the plurality of electronic components, determine whether the power availability of the power source exceeds the expected power consumption estimate, and in accordance with a determination that the power availability of the power source exceeds the expected power consumption estimate: allow the change in the operational state for the first electronic component to occur and maintain a current operational state for a second electronic component of the plurality of electronic components, and in accordance with a determination that the power availability of the power source does not exceed the expected power consumption estimate: allow the change in the operational state for the first electronic component and change an operational state of the second electronic component. Additionally or alternatively to one or more of the examples disclosed above, in some examples, the power manager is further configured to: receive a signal indicative of an ability of the power supply to supply a present power consumption of the plurality of electronic components; and in accordance with a determination that the power supply is unable to supply the present power consumption, change an operational state of at least one of the plurality of electronic components. Additionally or alternatively to one or more of the examples disclosed above, in some examples, the signal indicative of an ability of the power supply to supply a present power consumption is a voltage droop signal. Additionally or alternatively to one or more of the examples disclosed above, in some examples, the expected power consumption estimate is increased in accordance with the determination that the power supply is unable to meet the present demand. Additionally or alternatively to one or more of the examples disclosed above, in some examples, the power manager is further configured to: in accordance with the determination that the power availability of the power source does not exceed the expected power consumption estimate: determine an expected duration of power consumption for the change in operational state of the first electronic component; and select the second electronic component for a reduced power operational state wherein a latency associated with achieving the reduced power operational state of the second electronic component does not exceed the expected duration of power consumption by the first electronic component. Additionally or alternatively to one or more of the examples disclosed above, in some examples, changing the operational state of the second electronic component comprises throttling a processor, dimming a display or reducing a speaker sound pressure level. Additionally or alternatively to one or more of the examples disclosed above, in some examples, changing the operational state of the second electronic component comprises throttling a processor. Additionally or alternatively to one or more of the examples disclosed above, in some examples, changing the operation state of the second electronic component comprises throttling operation of a wireless transceiver or changing an operational mode of the wireless transceiver into a reduced power mode. Additionally or alternatively to one or more of the examples disclosed above, in some examples, generating the expected power consumption profile comprises combining power consumption models associated with the plurality of electronic components wherein each power consumption model includes information about an operational state of a corresponding electronic component. Additionally or alternatively to one or more of the examples disclosed above, in some examples, determining whether the power availability of the power source exceeds the expected power consumption estimate comprises determining whether the power source can provide a threshold power output for a time duration. Additionally or alternatively to one or more of the examples disclosed above, in some examples, determining whether the power availability of the power source exceeds the expected power consumption estimate comprises: determining whether the power source can provide a first power output for a first time duration; and determining whether the power source can provide a second power output for a second time duration, wherein the second time duration is greater than the first time duration and the first power output is greater than the second power output.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
   a power source;
   a plurality of electronic components configured to draw power from the power source; and
   a power manager configured to:
      receive information representing a power availability envelope of the power source describing power availability over a plurality of time windows;
      receive an indication of a requested change in an operational state for a first electronic component of the plurality of electronic components;
      based on the received indication of the requested change in operational state for the first electronic component, generate an expected power consumption estimate for the plurality of electronic components for the plurality of time windows;
      determine whether the power availability of the power source exceeds the expected power consumption estimate for the plurality of time windows; and
      in accordance with a determination that the power availability of the power source exceeds the expected power consumption estimate over each of the plurality of time windows:
         allow the change in the operational state for the first electronic component to occur and maintain a current operational state for a second electronic component of the plurality of electronic components; and
      in accordance with a determination that the power availability of the power source does not exceed the expected power consumption estimate over one or more of the plurality of time windows:
         allow the change in the operational state for the first electronic component and change an operational state of the second electronic component, wherein changing the operation state of the second electronic component causes the power availability over the plurality of time windows to exceed the power consumption estimate over the plurality of time windows.

2. The electronic device of claim 1, wherein the power manager is further configured to:
   receive a signal indicative of an ability of the power supply to supply a present power consumption of the plurality of electronic components; and
   in accordance with a determination that the power supply is unable to supply the present power consumption, change an operational state of at least one of the plurality of electronic components.

3. The electronic device of claim 2, wherein the signal indicative of an ability of the power supply to supply a present power consumption is a voltage droop signal.

4. The electronic device of claim 2, wherein the expected power consumption estimate is increased in accordance with the determination that the power supply is unable to meet the present demand.

5. The electronic device of claim 1, the power manager further configured to:
in accordance with the determination that the power availability of the power source does not exceed the expected power consumption estimate over one or more of the plurality of time windows:
determine an expected duration of power consumption for the change in operational state of the first electronic component; and
select the second electronic component for a reduced power operational state wherein a latency associated with achieving the reduced power operational state of the second electronic component does not exceed the expected duration of power consumption by the first electronic component.

6. The electronic device of claim 1, wherein:
changing the operational state of the second electronic component comprises throttling a processor, dimming a display or reducing a speaker sound pressure level.

7. The electronic device of claim 1, wherein changing the operational state of the second electronic component comprises throttling a processor.

8. The electronic device of claim 1, wherein changing the operation state of the second electronic component comprises throttling operation of a wireless transceiver or changing an operational mode of the wireless transceiver into a reduced power mode.

9. The electronic device of claim 1, wherein generating the expected power consumption estimate comprises combining power consumption models associated with the plurality of electronic components wherein each power consumption model includes information about an operational state of a corresponding electronic component over the plurality of time windows.

10. The electronic device of claim 1, wherein determining whether the power availability of the power source exceeds the expected power consumption estimate over each of the plurality of time windows comprises determining whether the power source can provide a threshold power output for a time duration.

11. The electronic device of claim 1, wherein determining whether the power availability of the power source exceeds the expected power consumption estimate over each of the plurality of time windows comprises:
determining whether the power source can provide a first power output for a first time duration; and
determining whether the power source can provide a second power output for a second time duration, wherein the second time duration is greater than the first time duration and the first power output is greater than the second power output.

12. A method comprising:
receiving information representing a power availability envelope of a power source describing power availability over a plurality of time windows;
receiving an indication of a requested change in an operational state for a first electronic component of a plurality of electronic components;
based on the received indication of the requested change in operational state for the first electronic component, generating an expected power consumption estimate for the plurality of electronic components for the plurality of time windows;
determining whether the power availability of the power source exceeds the expected power consumption estimate; and
in accordance with a determination that the power availability of the power source exceeds the expected power consumption estimate over each of the plurality of time windows:
allowing the change in the operational state for the first electronic component to occur and maintain a current operational state for a second electronic component of the plurality of electronic components; and
in accordance with a determination that the power availability of the power source does not exceed the expected power consumption estimate over one or more of the plurality of time windows:
allowing the change in the operational state for the first electronic component and changing an operational state of the second electronic component, wherein changing the operation state of the second electronic component causes the power availability over the plurality of time windows to exceed the power consumption estimate over the plurality of time windows.

13. A non-transitory computer readable storage medium storing one or more programs, the one or more programs comprising instructions, which when executed by a processor cause the processor to perform a method comprising:
receiving information representing a power availability envelope of a power source describing power availability over a plurality of time windows;
receiving an indication of a requested change in an operational state for a first electronic component of a plurality of electronic components;
based on the received indication of the requested change in operational state for the first electronic component, generating an expected power consumption estimate for the plurality of electronic components for the plurality of time windows;
determining whether the power availability of the power source exceeds the expected power consumption estimate over each of the plurality of time windows; and
in accordance with a determination that the power availability of the power source exceeds the expected power consumption estimate over each of the plurality of time windows:
allowing the change in the operational state for the first electronic component to occur and maintain a current operational state for a second electronic component of the plurality of electronic components; and
in accordance with a determination that the power availability of the power source does not exceed the expected power consumption estimate over one or more of the plurality of time windows:
allowing the change in the operational state for the first electronic component and changing an operational state of the second electronic component, wherein changing the operation state of the second electronic component causes the power availability over the plurality of time windows to exceed the power consumption estimate over the plurality of time windows.

14. The non-transitory computer readable storage medium of claim 13, the method further comprising:
receiving a signal indicative of an ability of the power supply to supply a present power consumption of the plurality of electronic components; and in accordance with a determination that the power supply is unable to supply the present power consumption, changing an operational state of at least one of the plurality of electronic components.

15. The non-transitory computer readable storage medium of claim 14, wherein the signal indicative of an ability of the power supply to supply a present power consumption is a voltage droop signal.

16. The non-transitory computer readable storage medium of claim 14, wherein a power allocation budget for the plurality of electronic components is decreased in accordance with the determination that the power supply is unable to meet the present demand.

17. The non-transitory computer readable storage medium of claim 13, the method further comprising:
in accordance with the determination that the power availability of the power source does not exceed the expected power consumption estimate over one or more of the plurality of time windows:
determining an expected duration of power consumption for the change in operational state of the first electronic component; and
selecting the second electronic component for a reduced power operational state wherein a latency associated with achieving the reduced power operational state of the second electronic component does not exceed the expected duration of power consumption by the first electronic component.

18. An electronic device comprising:
a power source;
a plurality of electronic components configured to draw power from the power source; and
a power manager configured to:
receive an indication of a change in power source conditions indicative of a change in a power availability of the power source over a plurality of time windows;
based on the received indication of the change in power source conditions indicative of a change in the power availability of the power source over the plurality of time windows, calculate the power availability of the power source and generate an expected power consumption estimate for the plurality of electronic components for the plurality of time windows;
determine whether the power availability of the power source exceeds the expected power consumption estimate for the plurality of time windows; and
in accordance with a determination that the power availability of the power source exceeds the expected power consumption estimate over each of the plurality of time windows:
allow the change in the operational state for the first electronic component to occur and maintain a current operational state for a second electronic component of the plurality of electronic components; and
in accordance with a determination that the power availability of the power source does not exceed the expected power consumption estimate over one or more of the plurality of time windows:
allow the change in the operational state for the first electronic component and change an operational state of the second electronic component, wherein changing the operation state of the second electronic component causes the power availability over the plurality of time windows to exceed the power consumption estimate over the plurality of time windows.

19. The electronic device of claim 18, wherein the power manager is further configured to: receive a signal indicative of an ability of the power supply to supply a present power consumption of the plurality of electronic components; and
in accordance with a determination that the power supply is unable to supply the present power consumption, change an operational state of at least one of the plurality of electronic components.

20. The electronic device of claim 19, wherein the signal indicative of an ability of the power supply to supply a present power consumption is a voltage droop signal.

21. The electronic device of claim 19, wherein the expected power consumption estimate is increased in accordance with the determination that the power supply is unable to meet the present demand.

22. The electronic device of claim 18, the power manager further configured to:
in accordance with the determination that the power availability of the power source does not exceed the expected power consumption estimate over one or more of the plurality of time windows:
determine an expected duration of power consumption for the change in operational state of the first electronic component; and
select the second electronic component for a reduced power operational state wherein a latency associated with achieving the reduced power operational state of the second electronic component does not exceed the expected duration of power consumption by the first electronic component.

23. The electronic device of claim 18, wherein generating the expected power consumption estimate comprises combining power consumption models associated with the plurality of electronic components wherein each power consumption model includes information about an operational state of a corresponding electronic component over the plurality of time windows.

24. The electronic device of claim 18, wherein determining whether the power availability of the power source exceeds the expected power consumption estimate for the plurality of time windows comprises determining whether the power source can provide a threshold power output for a time duration.

25. The electronic device of claim 18, wherein determining whether the power availability of the power source exceeds the expected power consumption estimate for the plurality of time windows comprises:
determining whether the power source can provide a first power output for a first time duration; and
determining whether the power source can provide a second power output for a second time duration, wherein the second time duration is greater than the first time duration and the first power output is greater than the second power output.

* * * * *